(12) United States Patent
Benjes et al.

(10) Patent No.: US 7,669,181 B2
(45) Date of Patent: *Feb. 23, 2010

(54) CLIENT INTERFACES FOR PACKAGES

(75) Inventors: Friederike Benjes, Heidelberg (DE); Andreas Blumenthal, Heidelberg (DE); Thomas Decker, Langenbrücken (DE); Rasmus Faust, Heidelberg (DE); Markus Frick, Ralsralre (DE); Gerd Kluger, Sinsheim (DE); Ulrich Koch, Heidelberg (DE); Helmut Prestel, Bad Schönborn (DE); Juergen Remmel, Muehlhausen (DE); Martin Runte, Darmstadt (DE); Andreas Simon Schmitt, Kulserslavtern (DE); Michael Schneider, Walldorf (DE)

(73) Assignee: SAP (AG), Walldorf (DE)

( * ) Notice: Subject to any disclaimer, the term of this patent is extended or adjusted under 35 U.S.C. 154(b) by 900 days.

This patent is subject to a terminal disclaimer.

(21) Appl. No.: 11/118,560

(22) Filed: Apr. 29, 2005

(65) Prior Publication Data
US 2006/0248544 A1    Nov. 2, 2006

(51) Int. Cl.
G06F 9/44       (2006.01)
G06F 15/16      (2006.01)

(52) U.S. Cl. .................... 717/103; 717/108; 709/202; 709/203

(58) Field of Classification Search ........... 707/101, 707/116, 121, 103
See application file for complete search history.

(56) References Cited

U.S. PATENT DOCUMENTS

| 5,287,507 A | * | 2/1994 | Hamilton et al. ............ 719/315 |
| 5,307,490 A |   | 4/1994 | Davidson et al. |
| 5,548,726 A |   | 8/1996 | Pettus |
| 5,754,841 A | * | 5/1998 | Carino, Jr. ..................... 707/3 |
| 5,764,897 A | * | 6/1998 | Khalidi ....................... 709/201 |
| 5,793,965 A | * | 8/1998 | Vanderbilt et al. .......... 709/203 |
| 5,802,367 A | * | 9/1998 | Held et al. ................... 719/332 |
| 5,872,973 A | * | 2/1999 | Mitchell et al. ............. 719/332 |
| 5,884,316 A | * | 3/1999 | Bernstein et al. ........ 707/103 R |
| 5,950,010 A |   | 9/1999 | Hesse et al. |
| 6,016,496 A | * | 1/2000 | Roberson ................ 707/103 R |
| 6,038,590 A | * | 3/2000 | Gish .......................... 709/203 |
| 6,043,837 A | * | 3/2000 | Driscoll et al. ................ 348/36 |
| 6,101,528 A | * | 8/2000 | Butt .......................... 709/203 |

(Continued)

FOREIGN PATENT DOCUMENTS

JP          07295929         11/1995

OTHER PUBLICATIONS

Waldo, J., "Remote procedure calls and Java Remote Method Invocation," Concurrency, IEEE, vol. 6, No. 3, pp. 5-7, Jul.-Sep. 1998.*

(Continued)

*Primary Examiner*—James Rutten
(74) *Attorney, Agent, or Firm*—Blakely, Sokoloff, Taylor & Zafman, LLP (57) ABSTRACT

A method and system for employing client interfaces for packages. In one embodiment, an access object associated with a service provided by a first package is located, where the service is seeking to access content residing at a second package. A client interface is then created at the second package using the access object. The client interface is used to provide access to the content by exposing the content to the service via the client interface.

12 Claims, 10 Drawing Sheets

U.S. PATENT DOCUMENTS

| | | | |
|---|---|---|---|
| 6,102,965 | A | 8/2000 | Dye et al. |
| 6,125,383 | A | 9/2000 | Glynias et al. |
| 6,134,603 | A * | 10/2000 | Jones et al. ................. 719/330 |
| 6,223,217 | B1 * | 4/2001 | Pettus ......................... 709/219 |
| 6,236,999 | B1 | 5/2001 | Jacobs et al. |
| 6,314,468 | B1 * | 11/2001 | Murphy et al. ............... 709/236 |
| 7,017,014 | B2 * | 3/2006 | Cuomo et al. ............... 711/144 |
| 7,047,518 | B2 | 5/2006 | Little et al. |
| 7,076,784 | B1 * | 7/2006 | Russell et al. ............... 719/315 |
| 2001/0013050 | A1 | 8/2001 | Shah |
| 2001/0055303 | A1 * | 12/2001 | Horton et al. ............... 370/389 |
| 2002/0035591 | A1 | 3/2002 | Kimura |
| 2003/0009754 | A1 | 1/2003 | Rowley et al. |
| 2003/0033191 | A1 * | 2/2003 | Davies et al. ................. 705/10 |
| 2005/0010919 | A1 | 1/2005 | Ramanathan et al. |
| 2005/0108704 | A1 | 5/2005 | Marinelli et al. |
| 2005/0155042 | A1 | 7/2005 | Kolb et al. |
| 2005/0256933 | A1 | 11/2005 | Millington et al. |
| 2007/0234290 | A1 | 10/2007 | Ronen et al. |

OTHER PUBLICATIONS

Tzi-cker Chiueh; Pilania, D., "Design, Implementation, and Evaluation of a Repairable Database Management System," Data Engineering, 2005. ICDE 2005. Proceedings. 21st International Conference on, pp. 1024-1035, Apr. 5-8, 2005.*

Finkelstein, et al., ""Software Package Requirements & Procurement"", *IEEE, Proceedings of 8th International Workshop on Software Specification and Design*, (1996), pp. 141-145.

Suleman, et al., ""A Flexible Approach to Web Component Packaging"", *SAICSIT*, (2006), 257-266.

Tom, Lunney, et al., ""Object Persistence in Java"", *PPPJ*, (2003), pp. 115-120.

U.S. Appl. No. 11/118,739, mailed Feb. 13, 2009, 16 pages.

"Using RMI with Client-Side Callbacks", BEA Systems, Inc., accessed Feb. 9, 2009 from http://web.archive.org/web/20000829110606/http://edocs.bea.com/wle/rmi/callbak.htm #1023769.

* cited by examiner

CLIENT INTERFACES FOR PACKAGES

TECHNICAL FIELD

Embodiments of the invention generally relate to the field of data processing systems and, more particularly, to a system and method for employing client interfaces for packages.

BACKGROUND

As application development projects grow larger, packages are becoming both increasingly important and cumbersome. For example, when changes are made to currently existing Advanced Business Application Programming™ (ABAP) software, the implication of such changes are difficult to foresee, which often causes problems in the future. Having an improved package can make the software's blueprint visible, which can make the changes to the software foreseeable and better protected against malicious changes.

Figure 1:
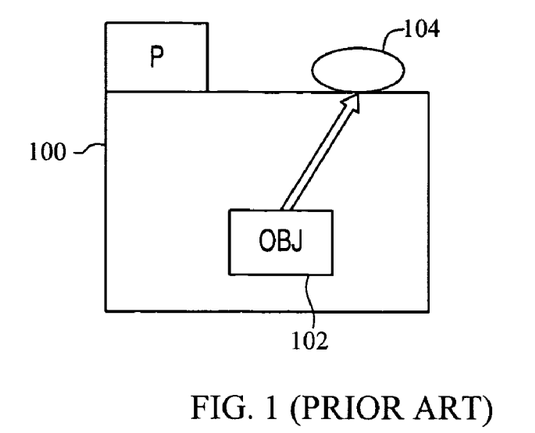
FIG. 1 illustrates a prior art package.

FIG. 1 illustrates a prior art package 100. The package 100 is also known as development classes because it represents a group of objects 102, where each object 102 is assigned to a development class. Each development object 102, such as report, global class, data element, and table, is assigned to the package 100. The object 102 contains organizational attributes, such as person responsible, application component, etc., and technical attributes, such as transport layers, software component, etc. The package 100 also includes a package interface 104 to expose the object 102 to those who seek the object 102.

The package 100 is viewed as a capsule whose content is hidden to the outside. Any interaction with the package's content is accomplished through the development objects 102 that are exposed via an interface 104 of the respective package 100. Furthermore, the package 100 determines transport properties of development object 102 contained in it, such as whether the object 102 can be exported from the system, or whether it can be exported, and what are the target systems (using the assignment to a transport layer).

Figure 2:
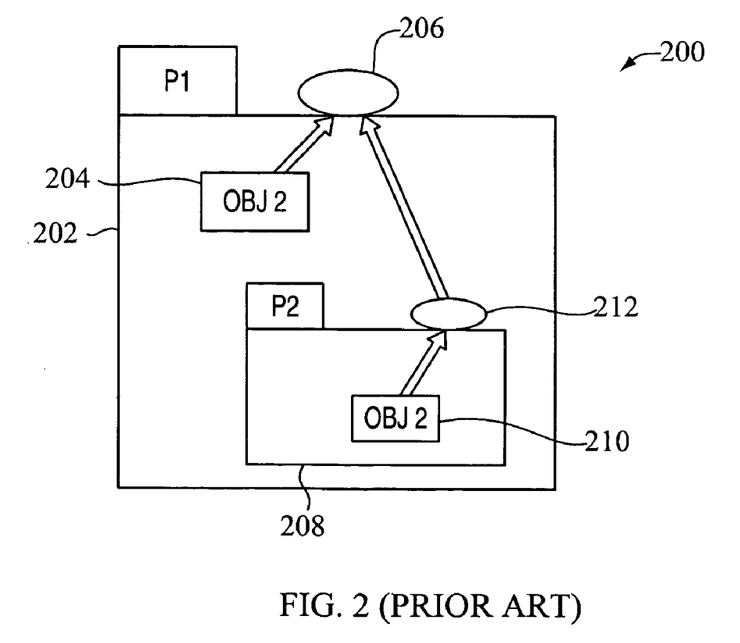
FIG. 2 illustrates a prior art nesting of multiple packages.

Referring now to FIG. 2, it illustrates nesting 200 of multiple packages 202, 208. As illustrated, a package 208 (e.g., subpackage) is nested into another package 202 (e.g., superpackage). When nesting 200, the subpackage 208 is visible only within its superpackage 202. This package nesting 200, for example, allows for structuring of packages 202, 208 by placing the development objects 210 needed only for a certain part of the implementation into a separate subpackage 208. The superpackage 202 not only exposes its own development objects 204 via its interface 206, but also exposes the objects 210 of its subpackage 208 through the subpackage's interface 212 and its own interface 206. Those development objects of the subpackage 208 that are not exposed at the superpackage's interface 206 are invisible outside the superpackage 202 and can only be used from within the superpackage 202.

Although the conventional package mechanism provides increasing flexibility for better structuring of software, and represents an essential tool for ensuring and tracking decoupling of software, further improvements to the existing package mechanism are needed. For example, the conventional package mechanism lacks new strategies with regard to handling generation of objects, interfacing, and enhancements to software. These limitations are further exasperated when different interfaces, modules, components, and/or services are used across the development project.

SUMMARY

A method and system for employing client interfaces for packages. In one embodiment, an access object associated with a service provided by a service package is located, where the service is seeking to access content residing at a client package. A client interface is then created at the client package using the access object. The client interface is used to provide access to the content by exposing the content to the service via the client interface.

BRIEF DESCRIPTION OF THE DRAWINGS

The appended claims set forth the features of the invention with particularity. The embodiments of the invention, together with its advantages, may be best understood from the following detailed description taken in conjunction with the accompanying drawings in which:

DETAILED DESCRIPTION

Described below is a system and method for employing client interfaces for packages. Throughout the description, for the purposes of explanation, numerous specific details are set forth in order to provide a thorough understanding of the embodiments of the present invention. It will be apparent, however, to one skilled in the art that the present invention may be practiced without some of these specific details. In other instances, well-known structures and devices are shown in block diagram form to avoid obscuring the underlying principles of the present invention.

In the following description, numerous specific details such as logic implementations, opcodes, resource partitioning, resource sharing, and resource duplication implementations, types and interrelationships of system components, and logic partitioning/integration choices may be set forth in order to provide a more thorough understanding of various embodiments of the present invention. It will be appreciated, however, to one skilled in the art that the embodiments of the present invention may be practiced without such specific details, based on the disclosure provided. In other instances, control structures, gate level circuits and full software instruction sequences have not been shown in detail in order not to obscure the invention. Those of ordinary skill in the art, with the included descriptions, will be able to implement appropriate functionality without undue experimentation.

Various embodiments of the present invention will be described below. The various embodiments may be embodied in machine-executable instructions, which may be used to cause a general-purpose or special-purpose processor or a machine or logic circuits programmed with the instructions to perform the various embodiments. Alternatively, the various embodiments may be performed by a combination of hardware and software.

Various embodiments of the present invention may be provided as a computer program product, which may include a machine-readable medium having stored thereon instructions, which may be used to program a computer (or other electronic devices) to perform a process according to various embodiments of the present invention. The machine-readable medium may include, but is not limited to, floppy diskette, optical disk, compact disk-read-only memory (CD-ROM), Digital Video Disk ROM (DVD-ROM), magneto-optical disk, read-only memory (ROM) random access memory (RAM), erasable programmable read-only memory (EPROM), electrically erasable programmable read-only memory (EEPROM), magnetic or optical card, flash memory, or another type of media/machine-readable medium suitable for storing electronic instructions. Moreover, various embodiments of the present invention may also be downloaded as a computer program product, wherein the program may be transferred from a remote computer to a requesting computer by way of data signals embodied in a carrier wave or other propagation medium via a communication link (e.g., a modem or network connection).

Figure 3:
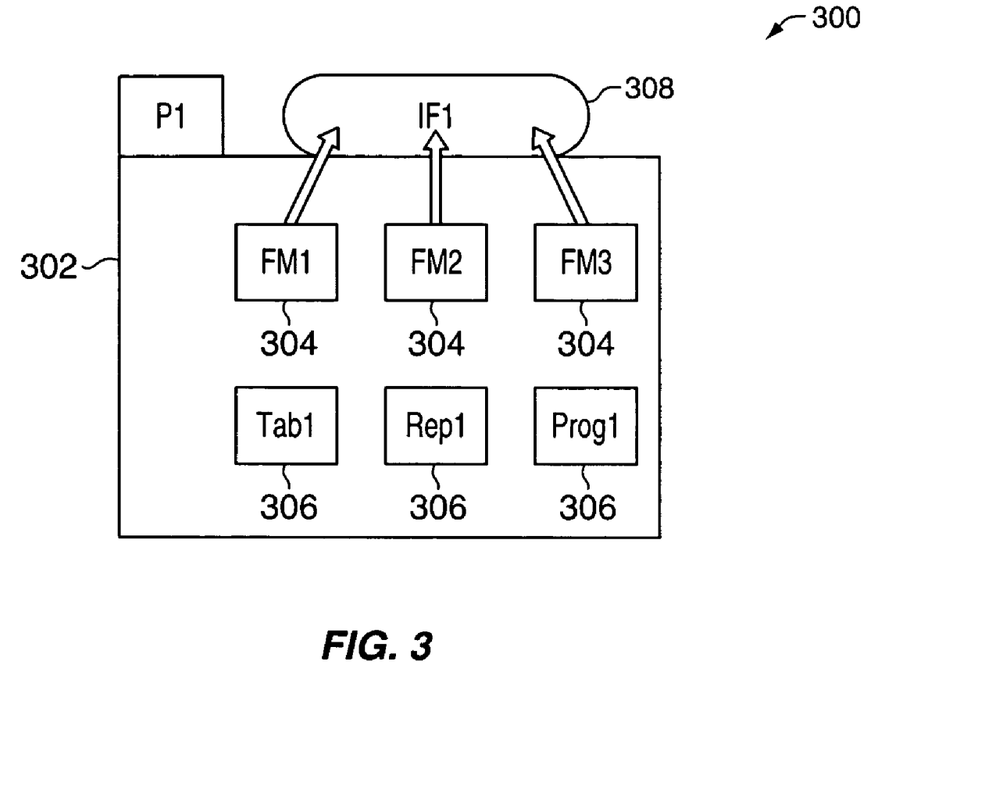
FIG. 3 illustrates a provider package.

FIG. 3 illustrates a provider package 302. A package typically includes a provider package (e.g., server) 302 or a user package (e.g., client). A provider package 302 is to offer services or elements 304-306 (e.g., function modules, types, business application programming interfaces (BAPIs), classes, tables, programs, views, and the like) to the outside components. These services 304-306 constitute one or more interfaces 308 between the provider package 302 and a user. In the illustrated embodiment, services 304 are visible and exported to the outside components via the interface 308, while services 306 are not visible. The provider package 302 may not know its context and present itself as a black box to the outside and deeper-level inside to increase locality and independence.

Figure 4:
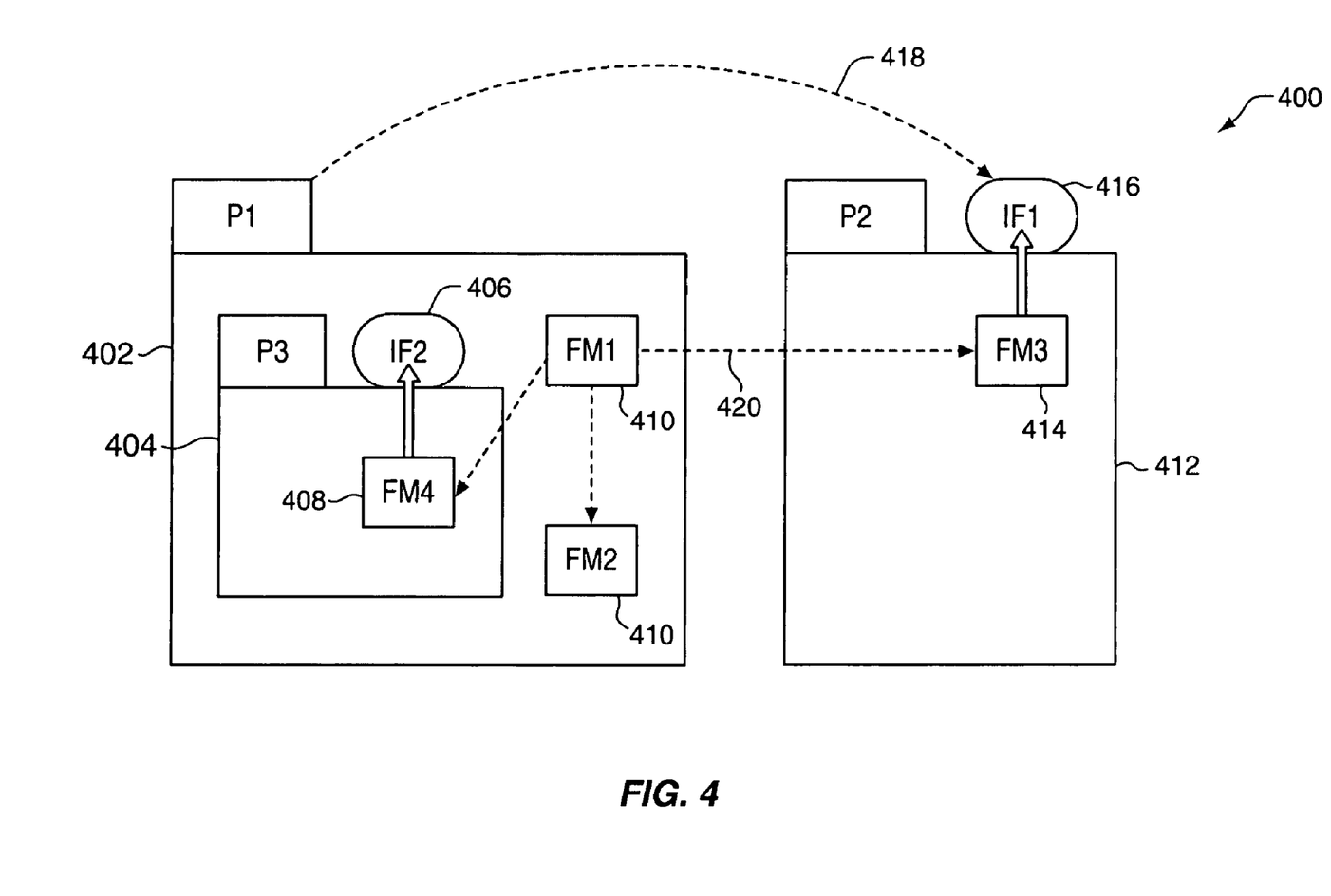
FIG. 4 illustrates user packages.

FIG. 4 illustrates user packages 402, 412. The user package 402 serves as a client using its own internal services 410, internal services 408 at subpackage 404, and external services 414 at user package 412. Internal services 410 (e.g., objects, classes, etc.) include those objects that are in the reference package itself and also include those services 408 that are contained in its subpackage 404. Other services 414 are considered external. The user package 402 also includes an embedded subpackage 404 that includes visible services 408 exposed to the superpackage 402 via the interface 406. The user package 402 can also use visible elements 414 of a parallel user package 412 when having appropriate usage permission 418. For example, the non-visible service 410 can make a call 420 to the visible service 414 at the parallel user package 412.

Figure 5:
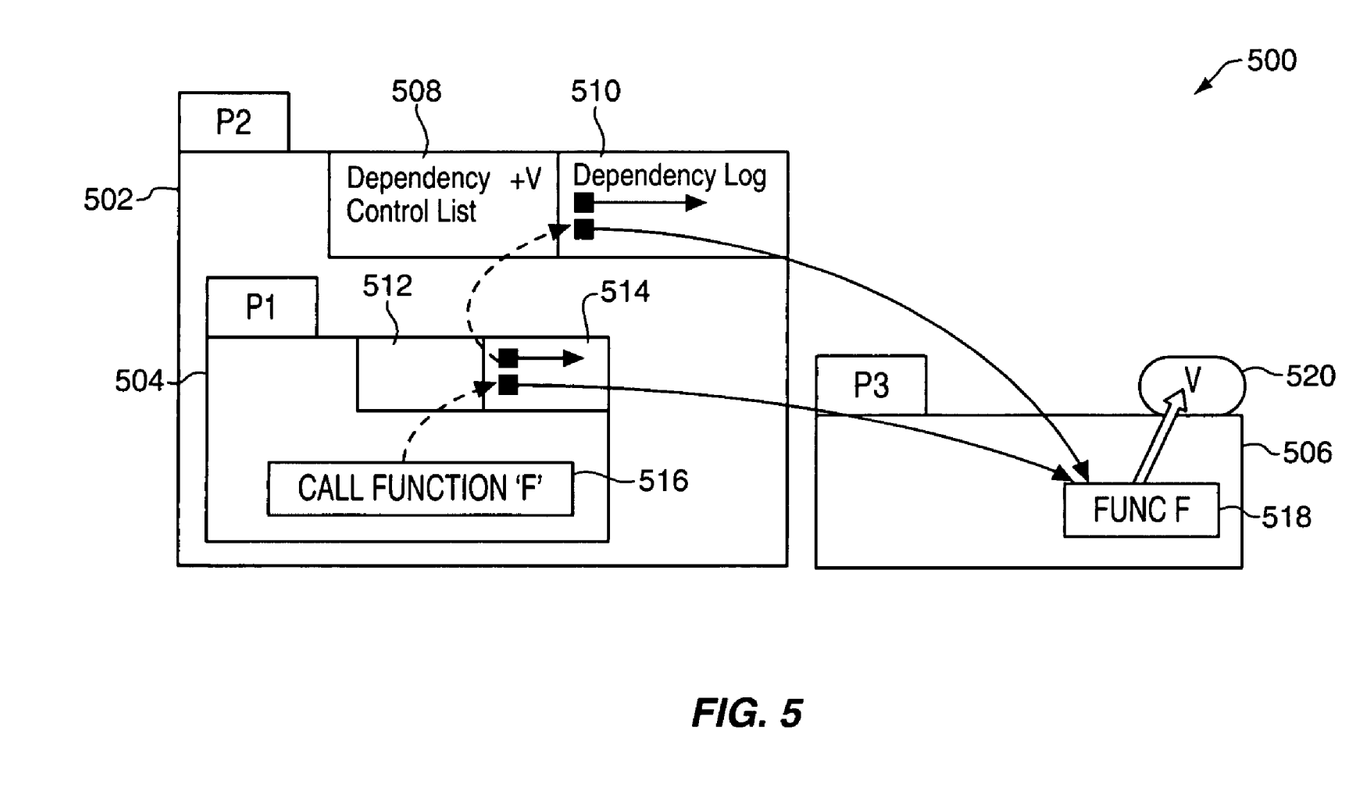
FIG. 5 illustrates an embodiment of dependency control lists and dependency logs.

FIG. 5 illustrates an embodiment of dependency control lists 508, 512 and dependency logs 510, 514. In one embodiment, both aspects, dependency control and dependency log, are treated separately. For example, the permission to use an object 518 is determined through dependency control lists 508, 512, and for each package 502 there is a dependency log 510 of objects used by the superpackage 502 and its subpackages 504. The dependency log 510 is capable of covering both the static and dynamic uses.

In the illustrated embodiment, using the dependency control list 508, package P2 502 allows the use of interface V 520 at package P3 506. Also, using the dependency control list 508 at package P2 502, the function module F 518 can be called 516. Package P1 504 may also have a dependency control list 512 which inherits the dependency control list 508 at package P2 502 (i.e., the dependency control list 512, implicitly, having the same entries as those of the dependency control list 508 without adding its own). The dependency log 510 of package P2 502 is updated whenever the program (e.g., reports, classes, etc.) that contains the call function statement to invoke function module F is inserted back into the running system after having been modified.

A dependency control list 508, 512 represents a list of external, visible interfaces. Further, objects contained in interfaces listed in these dependency control lists 508, 512 can be used by objects of the superpackage 502 and its subpackages 504. A dependency control list 508, 512 may be represented through an inclusion list and an exclusion list, where both of these lists, external, visible interfaces and external, visible interface lists can be included. The entries in both lists may depend on one or more of the following: (1) to the content of the reference package 502, without a subpackage 504; (2) to the content of the reference package 502 and the subpackage 504; and (3) to the content of the subpackage 504, without the content of the reference package 502. For example, a package may allow a specific subpackage to access a specific interface, etc., which means the dependency control list allows not only to specify which interfaces can be used, but also who can use them. It is, however, contemplated that more than two packages may be employed which could lead to several additional possible combinations than the three list here.

The dependency control lists 508, 512 are used in controlling access to certain interfaces. For example, (1) in a relevant inclusion list, there may not be an entry valid for the client package, such as package P2 502, available for the respective interfaces 520, in which case, the use of the interfaces 520 by the client package 502 may not occur; (2) in a relevant exclusion list, a valid, active entry for the client package 502 may exist for the respective interfaces 520, in which case, the use of the interface 520 may not occur; and (3) in a relevant exclusion list, a valid, non-active entry for the client package 502 exists for the respective interface 520, which allows the use of the interfaces 520. In one embodiment, the use of the interface 520 is defined by the dependency control lists 508, 512 and allowed within the framework of limitations as set forth in the dependency control lists 508, 512. For clarification, the term "non-active entries" refers to entries serving for backward compatibility and migration of existing coding, such as expressing non-approval of a particular interface anymore, but that the uses of that interface have not yet been removed from the coding. In other words, it is documented that the use is deprecated, but the affected coding continues to work. The term "active entries" refers to real exclusion entries.

Figure 6:
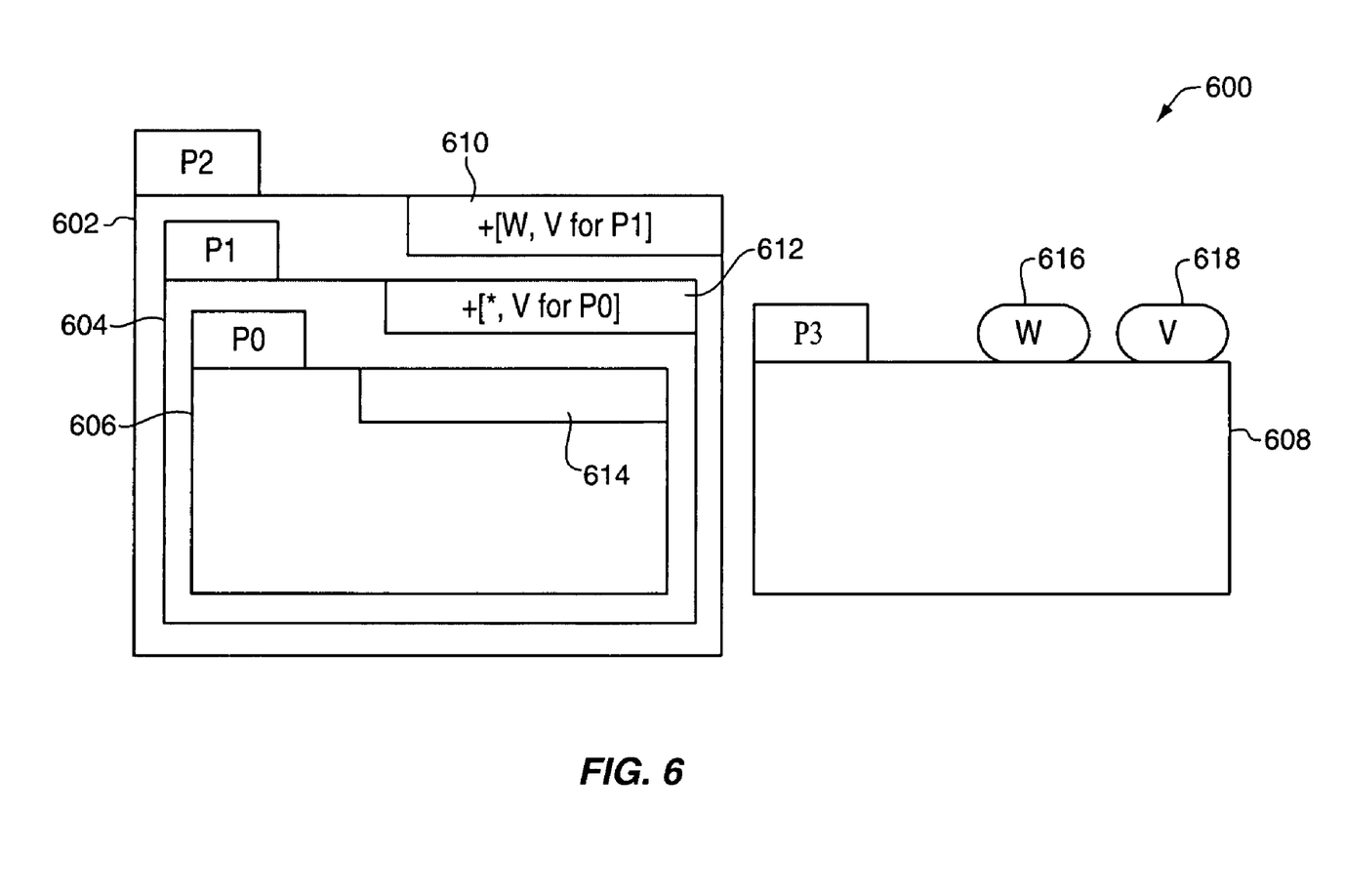
FIG. 6 illustrates an embodiment of dependency control lists.

FIG. 6 illustrates an embodiment of dependency control lists 610-614. In the illustrated embodiment, the dependency control list 610 of package P2 602 allows the use of interfaces W and V 616-618 at package P3 608 for subpackage P1 604. In the dependency control list 612 of package P1 604, the use of the privileges allowed by the dependency control list 610 of the subpackage P2 602, and expressly by interface V 618, is also allowed for subpackage P0 606. The express permission to use interface V 618 may not be necessary as interface V 618 is also covered by the pseudo entry. Further, package P0 606 does not define its own dependency control list 614 and thus inherits the one from package P1 604.

Figure 7:
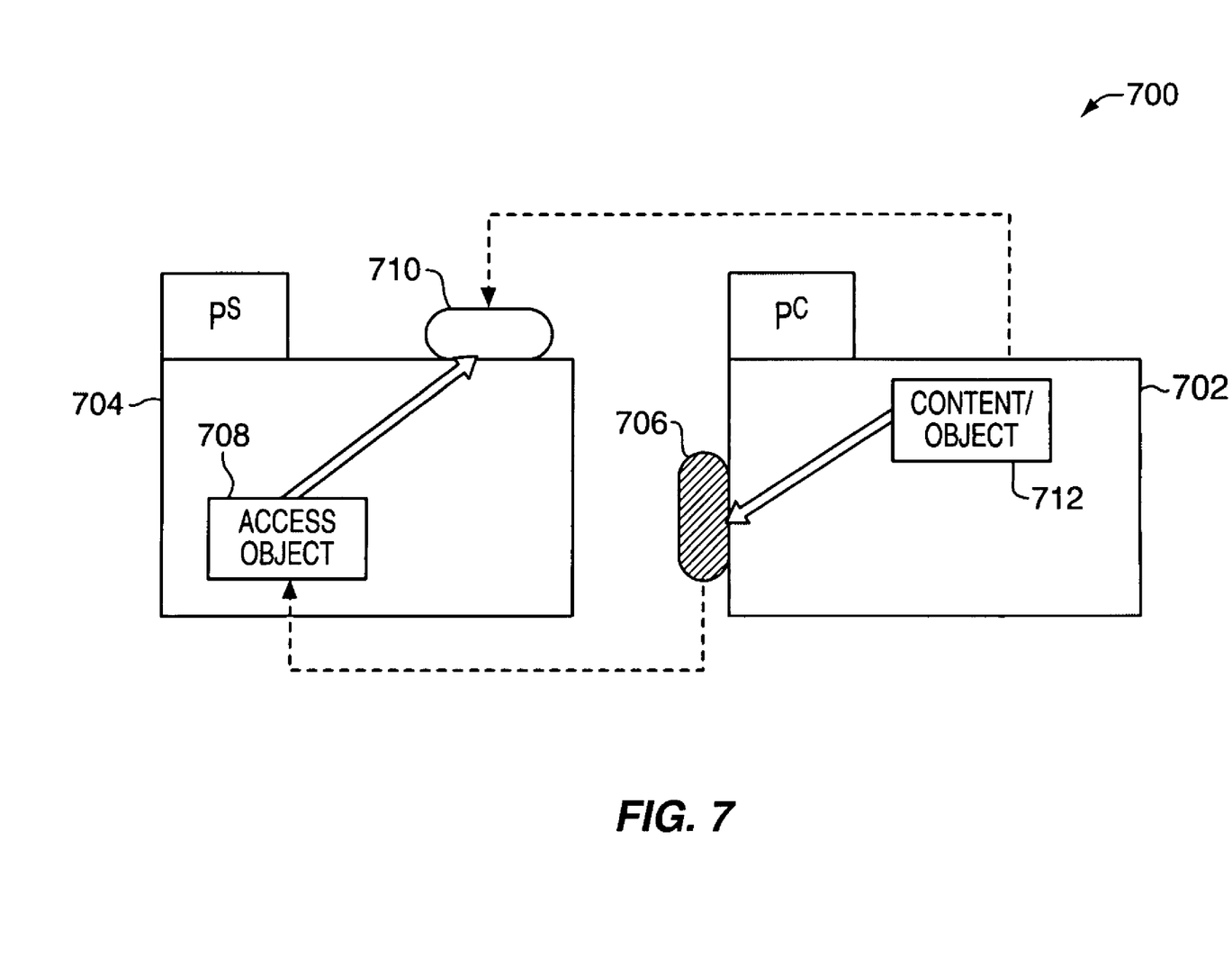
FIG. 7 illustrates an embodiment of a client interface and an access object in a package environment.

FIG. 7 illustrates an embodiment of a client interface 706 and an access object 708 in a package environment 700. If a client package (PC) 702 is to allow access to its content 712 to a particular service, it can set up a client interface 706 labeled with the access object 708 corresponding to the particular service. In one embodiment, a client interface 706 is created for each access object 708 that is exposed in a package interface 710 visible for the client package 702. For setting up the client interface 706, it may not be necessary to have the respective package interface 710 usable for the client package 702. Further, if the client interface 706 is transported to a system in which the access object 708 is not visible for the client package 702, the client interface 706 may be kept, but without having any effect.

In other words, the package 704 (including a superpackage (not shown)) through its dependency control lists may not have the control function to determine for which services the client interface 706 is to be created. Further, using this technique, editors are prevented from having to be included in the dependency lists, such as the editors that are used for processing the respective package content, but are not used directly from the service package 704. Conversely, the direct use (e.g., through calling a function module or a method) of an interface 710 that exposes the access object 708 may be subject to control through the respective dependency control lists. In other words, the weakening of the (normally expected) "usability" of an object in favor of just "visibility" as prerequisite to set up client interfaces 706 is justified as it is undesirable in the case when a special editor (e.g., refactoring tools, normal editor with certain special features necessary for a particular development project) needs to be used editing a package's content. In this case, the edited content does not depend on the editor, that is, it can be executed even if the editor is not available in the system, because making an interface usable by adding an entry to a dependency control list normally implies declaring a dependency (which does not exist in this special case, however), which would not be adequate.

Figure 8:
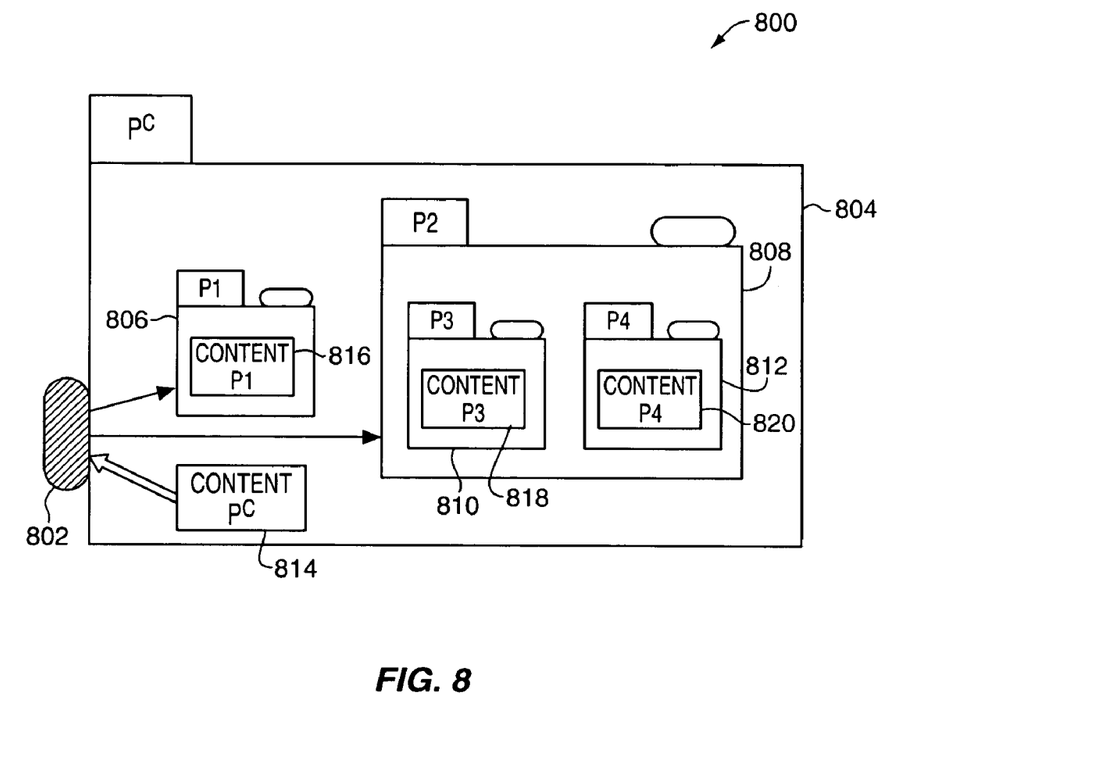
FIG. 8 illustrates an embodiment of a client package providing access using a client interface in a package environment.

The client interface 706 through a switch can be limited in its effect to the package 702 that defines it. In one embodiment, the client interface 706 is valid for a package 702 and, through "inheritance", for each of its subpackages (not shown), which means the access permissions declared in the client interface 706 are granted not only by the original package 702, but also by its subpackages. For subpackages, just those access permissions are inherited that also "make sense" for the subpackages, which means the access permissions related to internal objects of the declaring package would not take effect for the subpackages. However, generic permissions (e.g., generation/editing access to any object of a certain type) may take effect. Further, the original client interface 802 is linked, copied, and/or propagated (where changes on the original client interface immediately take effect on all copies) to the subpackages. Those parts of the superpackage's dependency control list are inherited by the subpackage that are valid in the subpackage's context as well.

There are ways in which a subpackage can protect itself against editing. For example, having granted access permissions declared in a client interface 706 not only by the original package 702, but also by its subpackages is one way certain subpackages can exclude themselves from being edited. If more objects are to be added to the objects already defined in the superpackage, they can re-use the content of the client interface of the superpackage by entering a special pseudo entry in the interface. Otherwise, the settings of the superpackage are replaced.

In the illustrated embodiment, the client package 702 exposes its object 712 using its client interface 706. The client interface 706 is created using the corresponding access object 708 exposed by the service package 710. The objects at the service package 704 can access the objects 712 at the client package 702 exposed via the client interface 706 using dynamic techniques. For example, a unique access object 708 is assigned to each service that needs to execute return calls to the clients. A client package 702 of the service then creates a client interface 706 at the client package 702 for that access object 708. Using the client interface 706, the client package 702 can then expose the required objects (e.g., FORMs, global variables, etc.) dynamically for this particular service (associated with the access object 708).

In one embodiment, any service at the service package 704 that needs to access objects 712 of its clients exposes an access object 708 in a suitable interface 710 (e.g., in the interface, the use of which necessitates for it to access the client) for its clients. One or more packages can be assigned to this access object 708. These packages contain the implementation of the respective service (e.g., implementation packages). An implementation package can be assigned to no more than a single access object 708.

The client interface 706 consists of a list of objects that are to be exposed for the service concerned, and further includes those objects that are exposed via package interfaces. In other words, anything that can potentially be exposed through package interfaces can potentially be exposed through client interfaces 706, so the set of objects that can potentially be exposed through client interfaces 706 at least contains those objects that can potentially be exposed packages interfaces. The actual package interfaces 706, however, may contain objects that are exposed at any actual client interface 706, and the actual client interface 706 may contain objects that are not exposed at any actual package interface. In the client interface 706, local objects of a program belonging to the client package 702 can also be exposed if they are marked as program-external objects; however, the marking itself does not expose the objects, but it simply enables that these objects may be accessed from other programs, which includes programs of the same package, so that the client interface 706 comes into play in cases when access is necessary across package boundaries. Examples of such objects include: global variables, local classes, and structure types. The client interface 706 is also used to expose the following: function modules of a function group, classes of the client package 702, and any types from other packages that can be used by the client package 702. Furthermore, the client interface 706 can expose other objects or types of objects from the client package 702 (e.g., including dynamically-created types of the package), if these objects at some point in time are related their original package.

In one embodiment, the client interface 706, the access object 708 of the service implemented is exposed. By including the access object 708 into the client interface 706, the service can in turn pass on the usage rights to a second service. For example, if service 1 exposes the access object 708 in a client service to service 2, service 2 can also access those objects that were exposed in the client interface 706 to service 1.

FIG. 8 illustrates an embodiment of a client package 804 in a package environment 800. In one embodiment, the client interface 802 is valid for a package 804 and, through "inheritance", for each of its subpackages P1, P2 806, 808, which means the access permissions declared in the client interface 802 are granted not only by the original package 804, but also by its subpackages 806, 808. For subpackages 806, 808, just those access permissions are inherited that also are valid in the context of the subpackages 806, 808. For example, the access permissions related to internal objects of the declaring package would not take effect for the subpackages 806, 808. However, generic permissions (e.g., generation/editing access to any object of a certain type) may take effect.

The illustrated client package 804 is regarded as a superpackage having a number of subpackages 806-812, which include direct subpackages P1 and P2 806, 808 and indirect subpackages P3 and P4 810, 812. The direct subpackages 806-808 are regarded as sibling packages to each other as they share the same superpackage 804. The indirect subpackages 810-812 are also siblings to each other as they share the same superpackage 808, which makes them indirect as they are indirect subpackages of the superpackage 804. Each of the subpackages 806-812 contains its own content 816-820.

Figure 9:
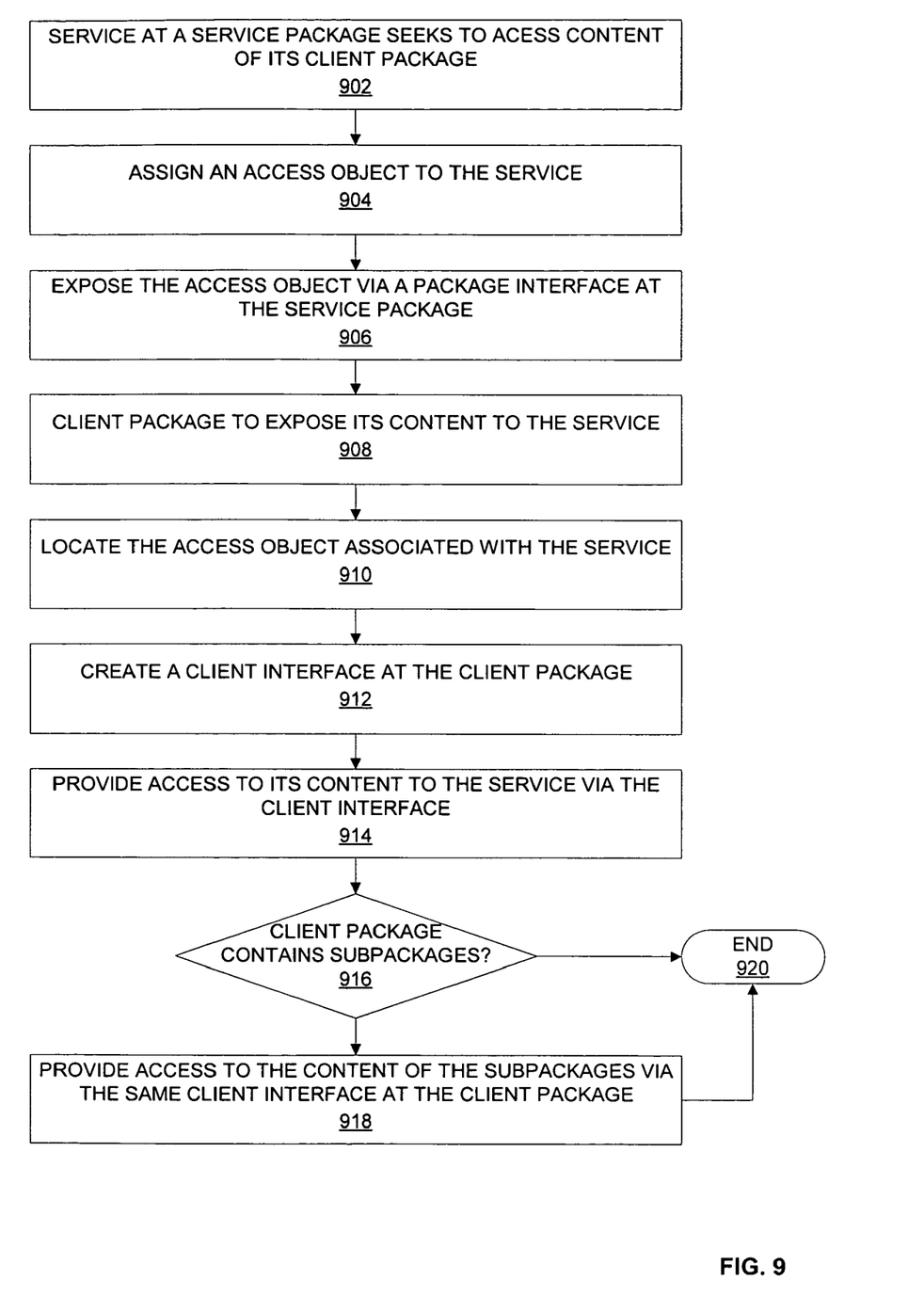
FIG. 9 illustrates an embodiment of a process for creating and using a client interface.

FIG. 9 illustrates an embodiment of a process for creating and using a client interface. A service at a service package seeks to access content of its client at processing block 902. The service is assigned an access object at processing block 904. Each service that is to access contents or object of its clients is to expose an access object using a suitable interface (e.g., package interface) at the service package. In other words, an access object may be needed for services that access their clients and can be exposed through any package interface, not just through packages interfaces of the service package. Between one and several service packages can be assigned to a single access object, as these service packages contain implementation of the respective services (e.g., implementation packages).

At processing block 906, in one embodiment, the access object is exposed at the corresponding service package via a package interface of one of the service packages; and, in another embodiment, the access object is contained in another package and is exposed through package interfaces of that package. For example, the access object can be assigned to a different package as an emergency fix (such as during migration of existing software) when the original service package cannot be changed any further because it has a different release schedule (i.e., the changes to the service package is available after the client package's planned shipping date). Also, the access object can be exposed through interfaces of packages that re-use the original service package, or through interfaces of super-packages of the service package that propagate the service. The exposure of the access object via the package interface helps facilitate identifying and locating the access object that corresponds to the service seeking access to the content of the client package. The access object is used to create an appropriate and corresponding client interface at the client package. In response to recognizing the need for the service to access the content at the client package, the client package is to expose its content to the service at processing block 908. To help create the client interface, the client package then locates the access object associated with the service via the package interface at the service package at processing block 910. The client interface at the client package is then created using the access object at processing block 912. Using the client interface, access to the content of the client package is provided at processing block 914.

At decision block 916, a determination is made as to whether the client package exposing its content through the client interface has any subpackages having their own content. Subpackages include direct subpackages for which the client package serves as the superpackage and indirect subpackages that are within another subpackage that serves as their superpackage. The client package may contain any number of subpackages, and the subpackages can contain any amount of content. If there are no subpackages within the client package, the process ends at termination block 920. However, if the client package contains subpackages, the same client interface is used to grant access to the content of the subpackages at processing block 918. It is to be noted, however, that the client interfaces may be valid for a package and, through inheritance, for each of its subpackages, which means the access permissions declared in the client interface are granted not just by the original package, but also by its subpackages. Also, the subpackages can protect themselves from inheriting their superpackage's client interface, and just those parts of the superpackage's client interfaces are inherited that are valid at the subpackages at well (i.e., not the entire content, but certain content that is valid). The process then ends at termination block 920.

The architectures and methodologies discussed above may be implemented with various types of computing systems such as an application server that includes a J2EE server that supports Enterprise Java Bean ("EJB") components and EJB containers (at the business layer) and/or Servlets and Java Server Pages ("JSP") (at the presentation layer). Of course, other embodiments may be implemented in the context of various different software platforms including, by way of example, Microsoft .NET, Windows/NT, Microsoft Transaction Server (MTS), the ABAP platforms developed by SAP AG and comparable platforms.

Figure 10:
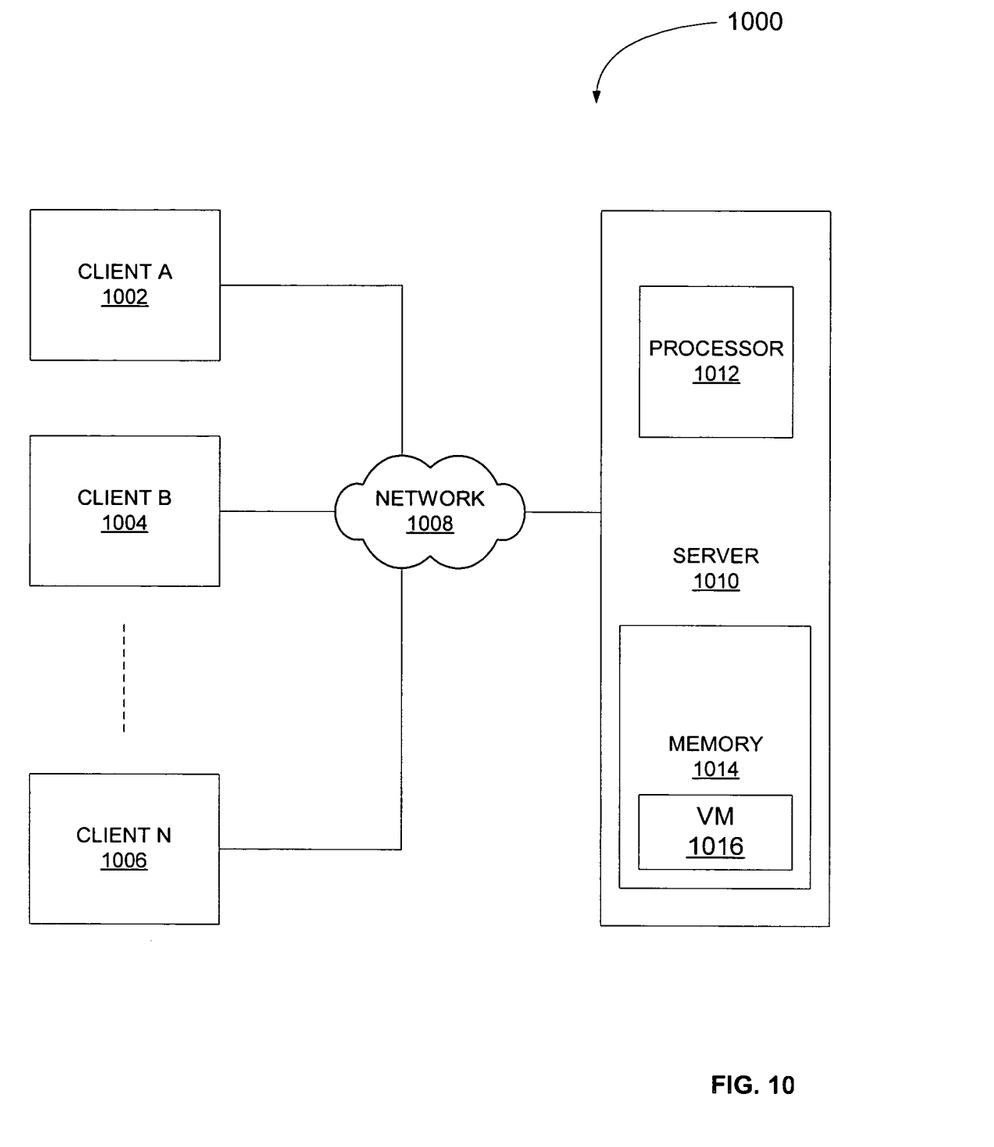
FIG. 10 illustrates an exemplary client/server system used in implementing one or more embodiments of the invention.

FIG. 10 illustrates an exemplary client/server system 1000 used in implementing one or more embodiments of the invention. In the illustrated embodiment, a network 1008 links a server 1010 with various client systems A-N 1002-1006. The server 1010 is a programmable data processing system suitable for implementing apparatus, programs, or methods in accordance with the description. The server 1010 provides a core operating environment for one or more runtime systems that process user requests. The server 1010 includes a processor 1012 and a memory 1014. The memory 1014 can be used to store an operating system a Transmission Control Protocol/Internet Protocol (TCP/IP) stack for communicating over the network 1008, and machine-executable instructions executed by the processor 1012. In some implementations, the server 1010 can include multiple processors, each of which can be used to execute machine-executable instructions.

The memory 1014 can include a shared memory area that is accessible by multiple operating system processes executing at the server 1010. An example of a suitable server to be implemented using the client/server system 1000 may include J2EE compatible servers, such as the Web Application Server developed by SAP AG of Walldorf, Germany, or the WebSphere Application Server developed by International Business Machines Corp. (IBM) of Armonk, N.Y.

Client systems 1002-1006 are used to execute multiple applications or application interfaces. Each instance of an application or an application interface can constitute a user session. Each user session can generate one or more requests to be processed by the server 1010. The requests may include instructions or code to be executed on a runtime system (e.g., the VM 1016) on the server 1010. A VM 1016 is an abstract machine that can include an instruction set, a set of registers, a stack, a heap, and a method area, like a real machine or processor. A VM 1016 essentially acts as an interface between program code and the actual processor or hardware platform on which the program code is to be executed. The program code includes instructions from the VM instruction set that manipulates the resources of the VM 1016.

Figure 11:
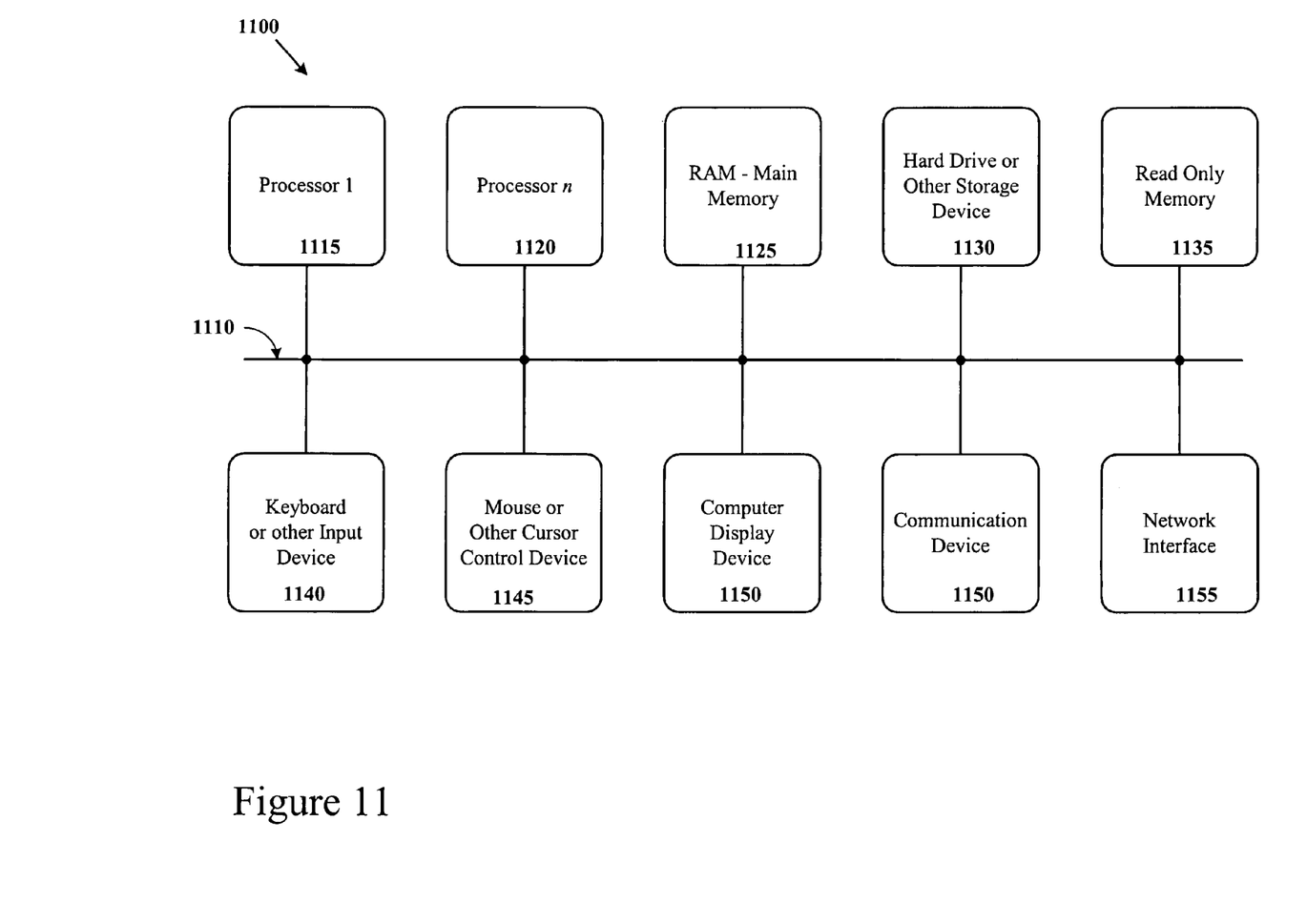
FIG. 11 is an exemplary computer system used in implementing one or more embodiments of the invention.

FIG. 11 is an exemplary computer system 1100 used in implementing an embodiment of the present invention. In this illustration, a system 1100 comprises a bus 1110 or other means for communicating data. The system 1100 includes one or more processors, illustrated as shown as processor 1 1115 through processor n 1120 to process information. The system 1100 further comprises a random access memory (RAM) or other dynamic storage as a main memory 1125 to store information and instructions to be executed by the processor 1115 through 1120. The RAM or other main memory 1125 also may be used for storing temporary variables or other intermediate information during execution of instructions by the processors 1115 through 1120.

A hard drive or other storage device 1130 may be used by the system 1100 for storing information and instructions. The storage device 1130 may include a magnetic disk or optical disc and its corresponding drive, flash memory or other nonvolatile memory, or other memory device. Such elements may be combined together or may be separate components. The system 1100 may include a read only memory (ROM) 1135 or other static storage device for storing static information and instructions for the processors 1115 through 1120.

A keyboard or other input device 1140 may be coupled to the bus 1110 for communicating information or command selections to the processors 1115 through 1120. The input device 1140 may include a keyboard, a keypad, a touch-screen and stylus, a voice-activated system, or other input device, or combinations of such devices. The computer may further include a mouse or other cursor control device 1145, which may be a mouse, a trackball, or cursor direction keys to communicate direction information and command selections to the processors and to control cursor movement on a display device. The system 1100 may include a computer display device 1150, such as a cathode ray tube (CRT), liquid crystal display (LCD), or other display technology, to display information to a user. In some environments, the display device may be a touch-screen that is also utilized as at least a part of an input device. In some environments, the computer display device 1150 may be or may include an auditory device, such as a speaker for providing auditory information.

A communication device 1150 may also be coupled to the bus 1110. The communication device 1150 may include a modem, a transceiver, a wireless modem, or other interface device. The system 1100 may be linked to a network or to other device using via an interface 1155, which may include links to the Internet, a local area network, or another environment. The system 1100 may comprise a server that connects to multiple devices. In one embodiment the system 1100 comprises a Java® compatible server that is connected to user devices and to external resources.

While the machine-readable medium 1130 is illustrated in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine of the system 1100 and that causes the machine to perform any one or more of the methodologies of the present invention. The term "machine-readable medium" shall accordingly be taken to include, but not be limited to, solid-state memories, optical and magnetic media, and carrier wave signals.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD-ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Furthermore, it is appreciated that a lesser or more equipped computer system than the example described above may be desirable for certain implementations. Therefore, the configuration of system 1100 may vary from implementation to implementation depending upon numerous factors, such as price constraints, performance requirements, technological improvements, and/or other circumstances.

It is noted that processes taught by the discussion above can be practiced within various software environments such as, for example, object-oriented and non-object-oriented programming environments, Java based environments (such as a J2EE environment or environments defined by other releases of the Java standard), or other environments (e.g., a .NET environment, a Windows/NT environment each provided by Microsoft Corporation).

It should be noted that, while the embodiments described herein may be performed under the control of a programmed processor, such as processors 1115 through 1120, in alternative embodiments, the embodiments may be fully or partially implemented by any programmable or hardcoded logic, such as field programmable gate arrays (FPGAs), TTL logic, or application specific integrated circuits (ASICs). Additionally, the embodiments of the present invention may be performed by any combination of programmed general-purpose computer components and/or custom hardware components. Therefore, nothing disclosed herein should be construed as limiting the various embodiments of the present invention to a particular embodiment wherein the recited embodiments may be performed by a specific combination of hardware components.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

While certain exemplary embodiments have been described and shown in the accompanying drawings, it is to be understood that such embodiments are merely illustrative of and not restrictive, and that the embodiments of the present invention are not to be limited to specific constructions and arrangements shown and described, since various other modifications may occur to those ordinarily skilled in the art upon studying this disclosure.

What is claimed is:

1. A method comprising:
   locating an access object assigned to a service of a service package at a service computer system, wherein
      the service computer system is coupled to a client computer system, the client computer system to include a client package further including a content and a dependency log of objects to log static and dynamic uses of objects,
      the service package includes a service package interface to publish objects and services of the service package,
      the access object is included in the service package and published via the service package interface, and
      the access object identifies the content of the client package;
   creating, based on the published access object, a client interface included in the client package, the content of the client package accessible to the service of the service package via the client interface, wherein access to the client interface is controlled by a dependency control list included in the client package; and
   accessing the content by exposing the content to the service using the client interface.

2. The method of claim 1, further comprising determining whether the client package includes subpackages, each subpackage having additional content, wherein the service to access the additional content of the subpackages at the client package using the client interface, access to the client interface by the subpackages is controlled by the dependency control list included in the client package, and objects used by the subpackages are logged in the dependency log included in the client package.

3. The method of claim 2, wherein each of the subpackages to inherit the dependency control list of the client package.

4. The method of claim 1, wherein the content comprises a plurality of objects including one or more of global variables, local classes, structure types, function modules, dynpros, and types from other packages.

5. A system comprising:
   means for locating an access object assigned to a service of a service package at a service computer system, wherein
      the service computer system is coupled to a client computer system, the client computer system to include a client package further including a content and a dependency log of objects to lair static and dynamic uses of objects,
      the service package includes a service package interface to publish objects and services of the service package,
      the access object is included in the service package and published via the service package interface, and
      the access object identifies the content of the client package;
   means for creating, based on the published access object, a client interface included in the client package, the content of the client package accessible to the service of the service package via the client interface, wherein access to the client interface is controlled by a dependency control list included in the client package; and
   means for accessing the content by exposing the content to the service using the client interface.

6. The system of claim 5, wherein the client package further includes subpackages, wherein each subpackage having subpackage content relating to the content, wherein the service to access the content of the subpackages at the client package using the client interface, access to the client interface by the subpackages is controlled by the dependency control list included in the client package, and objects used by the subpackages are logged in the dependency log included in the client package.

7. The system of claim 6, wherein each of the subpackages to inherit the dependency control list of the client package.

8. The system of claim 5, wherein the content comprises a plurality of objects including one or more of: global variables, local classes, structure types, function modules, dynpros, and types from other packages.

9. A machine-readable storage medium comprising instructions which, when executed by a machine, cause the machine to:
   locate an access object assigned to a service of a service package at a service computer system, wherein
      the service computer system is coupled to a client computer system, the client computer system to include a client package further including a content and a dependency log of objects to log static and dynamic uses of objects,
      the service package includes a service package interface to publish objects and services of the service package,
      the access object is included in the service package and published via the service package interface, and
      the access object identifies the content of the client package;
   create, based on the published access object, a client interface included in the client package, the content of the client package accessible to the service of the service package via the client interface, wherein access to the client interface is controlled by a dependency control list included in the client package; and
   access the content by exposing the content to the service using the client interface.

10. The machine-readable storage medium of claim 9, wherein the instructions which, when executed, cause the machine to determine whether the client package includes subpackages having additional content, wherein the service to access the additional content of the subpackages at the client package using the client interface, access to the client interface by the subpackages is controlled by the dependency control list included in the client package, and objects used by the subpackages are logged in the dependency log included in the client package.

11. The machine-readable storage medium of claim 10, wherein each of the subpackages to inherit the dependency control list of the client package.

12. The machine-readable storage medium of claim 9, wherein the content comprises a plurality of objects including one or more of global variables, local classes, structure types, function modules, dynpros, and types from other packages.

* * * * *

UNITED STATES PATENT AND TRADEMARK OFFICE
CERTIFICATE OF CORRECTION

| | | |
|---|---|---|
| PATENT NO. | : 7,669,181 B2 | Page 1 of 1 |
| APPLICATION NO. | : 11/118560 | |
| DATED | : February 23, 2010 | |
| INVENTOR(S) | : Benjes et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1130 days.

Signed and Sealed this

Twenty-eighth Day of December, 2010

David J. Kappos
*Director of the United States Patent and Trademark Office*